United States Patent
Middleton et al.

(10) Patent No.: US 9,680,576 B1
(45) Date of Patent: Jun. 13, 2017

(54) PHOTONIC FREQUENCY CONVERTING TRANSCEIVER AND RELATED METHODS

(71) Applicant: Harris Corporation, Melbourne, FL (US)

(72) Inventors: Charles F. Middleton, Rockledge, FL (US); Elliott J. Grafer, Melbourne Beach, FL (US); John R. DeSalvo, Cocoa Beach, FL (US)

(73) Assignee: HARRIS CORPORATION, Melbourne, FL (US)

( * ) Notice: Subject to any disclaimer, the term of this patent is extended or adjusted under 35 U.S.C. 154(b) by 0 days.

(21) Appl. No.: 15/153,856

(22) Filed: May 13, 2016

(51) Int. Cl.
  *H04B 10/2575* (2013.01)
  *H04B 10/40* (2013.01)
  *H04B 10/50* (2013.01)
  *H04B 10/548* (2013.01)

(52) U.S. Cl.
  CPC ......... *H04B 10/40* (2013.01); *H04B 10/2575* (2013.01); *H04B 10/503* (2013.01); *H04B 10/548* (2013.01)

(58) Field of Classification Search
  CPC .. H04B 10/2575; H04B 10/40; H04B 10/503; H04B 10/548
  USPC .......................................................... 398/115
  See application file for complete search history.

(56) References Cited

U.S. PATENT DOCUMENTS

| 5,710,651 | A | 1/1998 | Logan | |
| 6,256,130 | B1 | 7/2001 | Bulow | |
| 8,666,253 | B2 | 3/2014 | Williams et al. | |
| 2002/0131662 | A1* | 9/2002 | Strutz | H03D 9/00 385/1 |
| 2005/0013612 | A1* | 1/2005 | Yap | G02F 2/002 398/53 |
| 2013/0028551 | A1* | 1/2013 | DeSalvo | H03H 2/003 385/2 |
| 2013/0236187 | A1* | 9/2013 | Middleton | H04B 10/00 398/116 |

(Continued)

OTHER PUBLICATIONS

Middleton et al. "An adaptive, agile, reconfigurable photonic system for managing analog signals" Harris Corporation White Paper: Harris.com; Sep. 10, 2014; pp. 10.

(Continued)

*Primary Examiner* — Dalzid Singh
(74) *Attorney, Agent, or Firm* — Allen, Dyer, Doppelt & Gilchrist, P.A.

(57) ABSTRACT

A photonic frequency converting transceiver may include a laser, and a downconverter receiver branch including a first optical modulator optically coupled to the laser and configured to modulate laser light based upon an RF input signal and a first optical bandpass filter. An upconverter transmitter branch may include a second optical modulator optically coupled to the laser and configured to modulate laser light based upon an intermediate frequency input signal, and a second optical bandpass filter. A shared local oscillator branch may include a third optical modulator optically coupled to the laser and configured to modulate laser light based upon a local oscillator signal, and a third optical bandpass filter. The transceiver may further include photodetectors optically coupled to the optical bandpass filters to generate a downconverted intermediate frequency output signal and an upconverted RF output signal.

21 Claims, 3 Drawing Sheets

(56) References Cited

U.S. PATENT DOCUMENTS

2017/0005732 A1* 1/2017 Schaefer .............. H04B 10/564

OTHER PUBLICATIONS

Clark et al. "A phase-modulation I/Q-demodulaiton microwave-to-digital photonic link" IEEE Transactions on Microwave Theory and Techniques. vol. 58, No. Nov. 11, 2010; pp. 3039-3058.
Karim et al. "High dynamic range microwave photonic links for RF signal transport an RF-IF conversion" Journal of Lightwave Technology, vol. 26, No. 15, Aug. 1, 2008; pp. 2718-2724.
Capmany et al. "Microwave photonics combines two worlds" Nature Photonics. vol. 1, Jun. 2007; pp. 319-330.
Scotti et al. "Photonic-based RF transceiver for UWB multi-carrier wireless systems" Photonics, 2014, 1, pp. 146-153.
Ghelfi et al. "A fully photonics-based coherent radar system" Nature 507, 341-345 (Mar. 20, 2014) Abstract Only.
Yi et al. "Microwave frequency up-conversion based on simultaneous mixing and frequency selection" Optical Communications and Networks (ICOCN), 2015 14th International Conference on, conference date Jul. 3-5, 2015; pp. 1-3; published by IEEE. Abstract Only.

* cited by examiner

PHOTONIC FREQUENCY CONVERTING TRANSCEIVER AND RELATED METHODS

TECHNICAL FIELD

The present invention relates to communications systems, and more particularly, to electro-optical communications devices and related methods.

BACKGROUND

Analog signal processing is an important part of many modern communications systems, such as satellite systems, for example. A received signal from an antenna may include digital or analog information, and it may ultimately be processed digitally, but unless the signal can be digitized directly (a challenging prospect as the frequency of the signal increases), there may be some amount of analog signal processing required. This may include amplification, filtering, transmission over some distance, distribution to multiple receivers/transmitters, and frequency conversion for up- or down-conversion. RF and microwave components are very mature, and a baseline level of performance has been demonstrated for these processing functions. Demand for capacity and the broader use and congestion of the electromagnetic spectrum are among the forces increasing the complexity, cost, and performance requirements of analog systems. As higher levels of performance and higher carrier frequencies become desired, especially in the millimeter wave portion of the spectrum, new approaches may be desirable to meet the challenges. Photonics offers certain advantages in this regard: bandwidth; size, weight and power (SWaP); linearity; frequency agility; and providing a reconfigurable infrastructure for analog signal processing.

Photonic systems may cover a wide frequency range and instantaneous bandwidth (IBW), with frequency ranges extending to millimeter waves and an IBW as large as 4 GHz or more. Optical fiber provides an exceptionally low loss transmission medium, with roughly 0.2 dB/km loss regardless of the analog frequency it is carrying. Wavelength division multiplexing may further extend bandwidth by allowing multiple signals to share the same path.

The SWaP of a photonic system may be relatively low due in part to the wide bandwidth of the system: a single set of hardware may cover many decades of the RF spectrum. Optical fiber is also substantially lighter in weight than coaxial cable, and its inherent immunity to electromagnetic interference reduces the cost, effort and space desired for shielding.

The linearity of a system may be important when distortion effects will limit performance. Traditional RF and microwave components in a congested RF spectrum may lead to severe signal distortion. With photonic components, the nonlinearities are different, and these differences may be applied in ways that surpass the performance of traditional approaches. One example is the suppression of M×N mixing spurs for wideband frequency conversion.

The ability to rapidly tune a system over wide frequency ranges opens up the useable spectrum, enabling a frequency agile system. A photonic system's frequency range is usually set by either the electro-optic modulator or the photodetector. For each of these components, commercial off-the shelf (COTS) devices exist extending well into the millimeter wave region of the spectrum. Tuning the wavelength of a laser or optical bandpass filter can provide quick access to any portion of the spectrum within the range of these components.

The wide bandwidth and large frequency range of a photonic system may provide a flexible, high frequency backbone that can adapt to changing missions. Such a reconfigurable system may enable flexible architectures (such as described below), reduce the cost of ownership, and adjust to changing environments. Further background details on photonic frequency conversion systems may be found in Middleton et al., "An Adaptive, Agile, Reconfigurable Photonic System for Managing Analog Signals", Harris Corporation White Paper, Sep. 10, 2014, which is hereby incorporated herein in its entirety by reference.

In certain applications, it may be desired to simultaneously transmit and receive high frequency communications signals, e.g., radar signals. While electronic components exist that can upconvert and downconvert signals, such electronic components may not be suitable for the relatively high frequencies encountered in these types of applications, and may not provide desired performance. More particularly, wideband millimeter wave (mmW) compatibility may be desirable to address emerging radar or other high frequencies with respect to existing legacy electronic receivers.

Current approaches tend to have a gap in mmW frequencies and bandwidth. With conventional RF block converters, size, weight, and power (SWaP) requirements may be difficult to achieve. Other challenges may include a difficulty addressing millimeter-wave signals, required banding of signals, and wideband performance limited by M×N mixing spurs, for example.

SUMMARY

A photonic frequency converting transceiver may include a laser, and a downconverter receiver branch including a first optical modulator optically coupled to the laser and configured to modulate laser light based upon a radio frequency (RF) input signal and a first optical bandpass filter optically coupled to the first optical modulator. An upconverter transmitter branch may include a second optical modulator optically coupled to the laser and configured to modulate laser light based upon an intermediate frequency input signal, and a second optical bandpass filter optically coupled to the second optical modulator. A shared local oscillator branch may include a third optical modulator optically coupled to the laser and configured to modulate laser light based upon a local oscillator signal, and a third optical bandpass filter optically coupled to the third optical modulator. The transceiver may further include a first photodetector optically coupled to the first and third optical bandpass filters and configured to generate a downconverted intermediate frequency output signal, and a second photodetector optically coupled to the second and third optical bandpass filters and configured to generate an upconverted RF output signal.

More particularly, the first and second optical modulators may comprise Mach-Zehnder modulators. Furthermore, each of the first, second, and third bandpass filters may comprise a fiber Bragg grating (FBG). Moreover, the photonic frequency converting transceiver may further include a respective polarization maintaining (PM) circulator coupled to each of the first, second, and third FBGs.

The photonic frequency converting transceiver may further include a respective optical waveguide coupled between each of the first, second, and third bandpass filters and the first and second photodetectors. By way of example, the first photodetector may comprise a balanced photodetector. Furthermore, the laser may comprise a continuous wave (CW) laser, for example.

The photonic frequency converting transceiver may further include an optical amplifier coupled between the laser and the first, second, and third optical modulators. In one example embodiment, the transceiver may further include a common housing, and the downconverter receiver branch, the upconverter transmitter branch, the shared local oscillator branch, and the first and second photodetectors may be carried by the common housing. In accordance with another example embodiment, the transceiver may further include a photonic chip substrate, and the downconverter receiver branch, the upconverter transmitter branch, the shared local oscillator branch, and the first and second photodetectors may be integrated on the photonic chip substrate.

A related system may include at least one radio frequency (RF) antenna configured to receive/transmit RF input/output signals, electronic RF circuitry configured to generate or process an intermediate frequency input signal, and receive an intermediate frequency output signal, and a photonic frequency converting transceiver, such as the one described briefly above.

A related photonic frequency conversion method may include modulating light from a laser based upon an RF input signal using a first optical modulator and filtering the laser light modulated based upon the frequency input signal with a first optical bandpass filter, modulating light from the laser based upon an intermediate RF input signal using a second optical modulator and filtering the light modulated based upon the intermediate RF input with a second optical bandpass filter, and modulating light from the laser based upon a shared local oscillator signal using a third optical modulator and filtering the light modulated based upon the shared local oscillator signal with a third optical bandpass filter. The method may further include generating a downconverted intermediate frequency output signal using a first photodetector optically coupled to the first and third optical bandpass filters, and generating an upconverted RF output signal using a second photodetector optically coupled to the second and third optical bandpass filters.

DETAILED DESCRIPTION OF THE EMBODIMENTS

Figure 1:
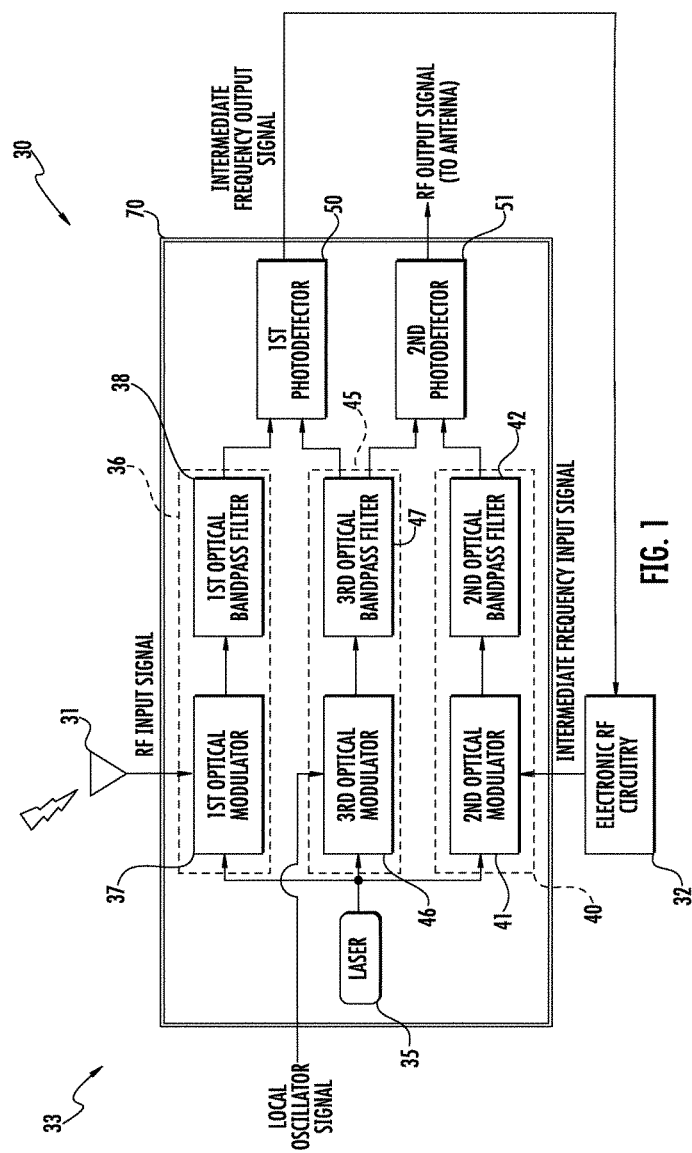
FIG. 1 is a schematic block diagram of a communications system including a photonic frequency converting transceiver in accordance with an example embodiment.

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Analog signal processing is an important part of many modern communications systems, such as satellite systems, for example. A received signal from an antenna may include digital or analog information, and it may ultimately be processed digitally, but unless the signal can be digitized directly (a challenging prospect as the frequency of the signal increases), there may be some amount of analog signal processing required. This may include amplification, filtering, transmission over some distance, distribution to multiple receivers/transmitters, and frequency conversion for up- or down-conversion. RF and microwave components are very mature, and a baseline level of performance has been demonstrated for these processing functions. Demand for capacity and the broader use and congestion of the electromagnetic spectrum are among the forces increasing the complexity, cost, and performance requirements of analog systems. As higher levels of performance and higher carrier frequencies become desired, especially in the millimeter wave portion of the spectrum, new approaches may be desirable to meet the challenges. Photonics offers certain advantages in this regard: bandwidth; size, weight and power (SWaP); linearity; frequency agility; and providing a reconfigurable infrastructure for analog signal processing.

Photonic systems may cover a wide frequency range and instantaneous bandwidth (IBW), with frequency ranges extending to millimeter waves and an IBW as large as 4 GHz or more. Optical fiber provides an exceptionally low loss transmission medium, with roughly 0.2 dB/km loss regardless of the analog frequency it is carrying. Wavelength division multiplexing may further extend bandwidth by allowing multiple signals to share the same path.

The SWaP of a photonic system may be relatively low due in part to the wide bandwidth of the system: a single set of hardware may cover many decades of the RF spectrum. Optical fiber is also substantially lighter in weight than coaxial cable, and its inherent immunity to electromagnetic interference reduces the cost, effort and space desired for shielding.

The linearity of a system may be important when distortion effects will limit performance. Traditional RF and microwave components in a congested RF spectrum may lead to severe signal distortion. With photonic components, the nonlinearities are different, and these differences may be applied in ways that surpass the performance of traditional approaches. One example is the suppression of M×N mixing spurs for wideband frequency conversion.

The ability to rapidly tune a system over wide frequency ranges opens up the useable spectrum, enabling a frequency agile system. A photonic system's frequency range is usually set by either the electro-optic modulator or the photodetector. For each of these components, commercial off-the shelf (COTS) devices exist extending well into the millimeter wave region of the spectrum. Tuning the wavelength of a laser can provide quick access to any portion of the spectrum within the range of these components.

The wide bandwidth and large frequency range of a photonic system may provide a flexible, high frequency backbone that can adapt to changing missions. Such a reconfigurable system may enable flexible architectures (such as described below), reduce the cost of ownership, and adjust to changing environments. Further background details on photonic frequency conversion systems may be found in Middleton et al., "An Adaptive, Agile, Reconfigurable Photonic System for Managing Analog Signals", Harris Corporation White Paper, Sep. 10, 2014, which is hereby incorporated herein in its entirety by reference.

Figure 2:
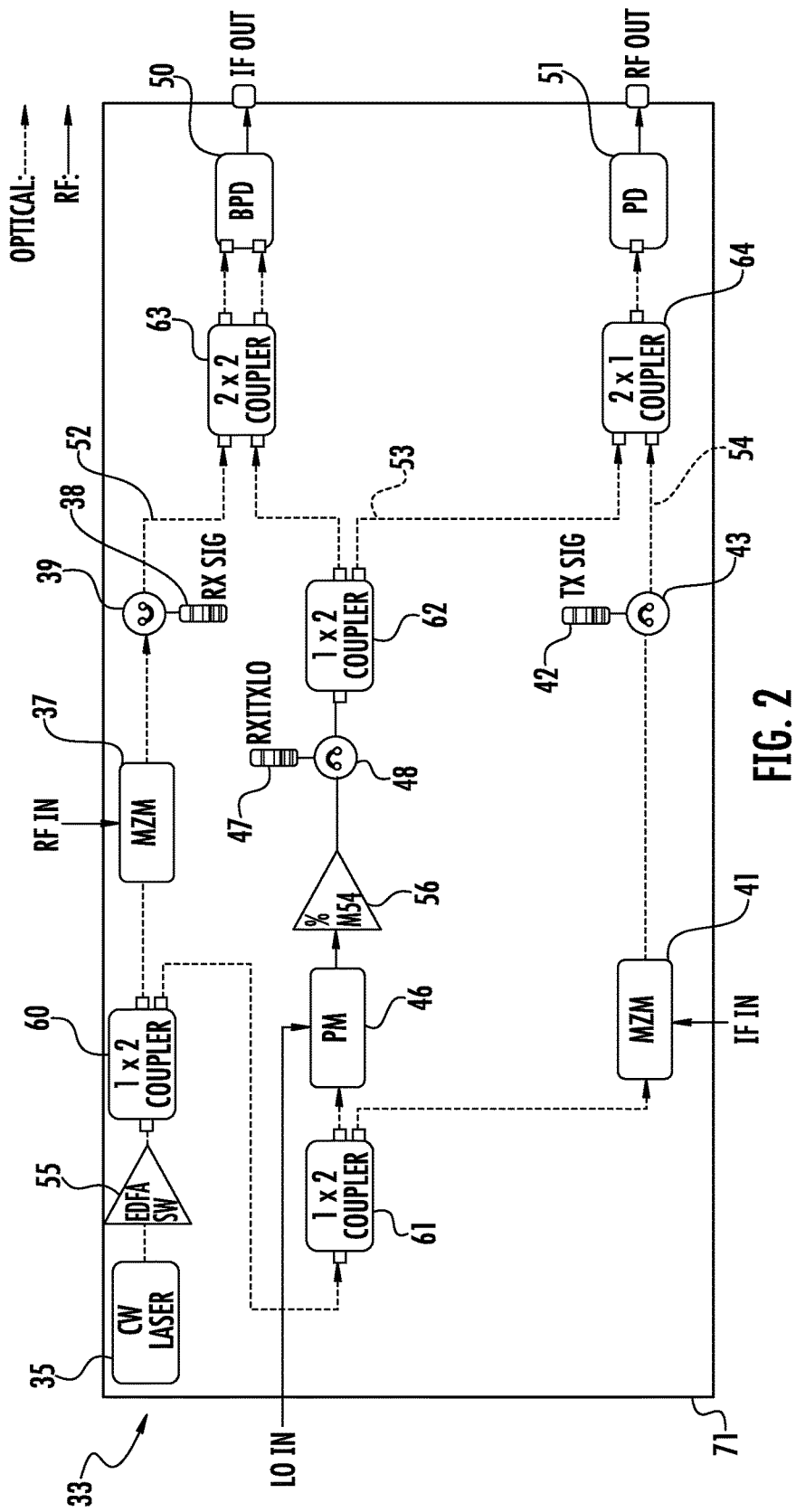
FIG. 2 is a more detailed schematic block diagram of an example implementation of the photonic frequency converting transceiver of FIG. 1.
Figure 3:
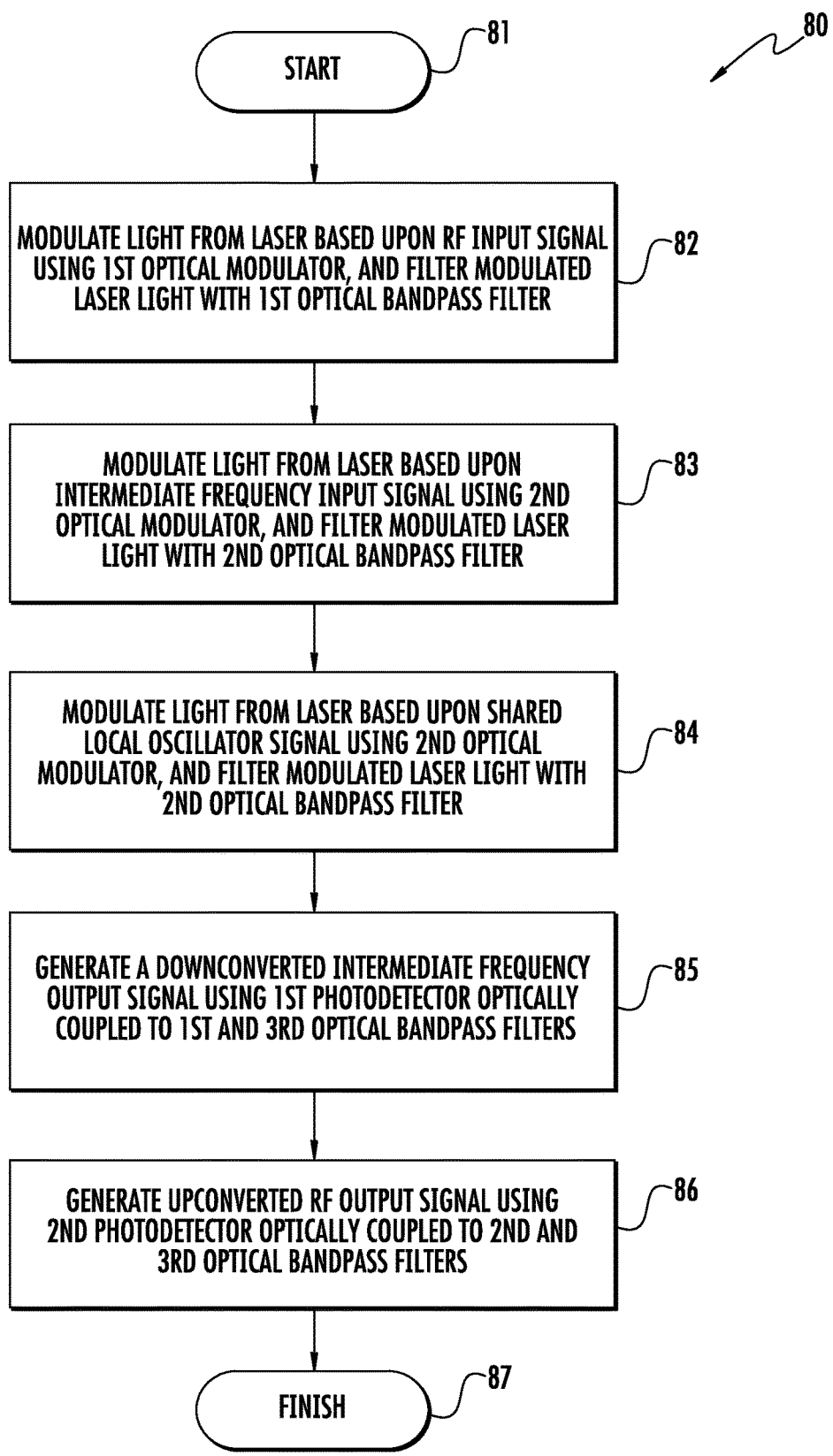
FIG. 3 is a flow diagram illustrating example method aspects associated with the system of FIG. 1.

Turning now to FIGS. 1-3, an example communications system 30 illustratively includes a radio frequency (RF) antenna 31 configured to receive an RF input signal, a photonic frequency converting transceiver 33 configured to convert the RF input signal to an IF, and electronic RF circuitry 32 configured to generate or process an IF input signal for the photonic frequency converting transceiver 33.

By way of example, the RF input signal may be a voice signal, radar signal, millimeter wave (mmW) signal, etc.

The photonic frequency converting transceiver 33 may be used to simultaneously up- and down-convert high frequency "next-gen" bands to and from a user-defined Intermediate Frequency (IF). This may advantageously help provide seamless integration with existing digital signal processing receivers for use in next-gen frequency applications. By way of example, such next-gen frequencies may be in a range 33 from 4 baseband to 100 GHz or higher.

More particularly, the transceiver 33 illustratively includes a laser 35, such as a continuous wave (CW) laser, for example. In accordance with one example implementation, the CW laser may have a 1550 nm wavelength, although other wavelengths may be used in different embodiments. The transceiver 33 further illustratively includes a downconverter receiver branch 36 including a first optical modulator 37 optically coupled to the laser 35 and configured to modulate laser light based upon the RF input signal from the antenna 31. The receiver branch 36 further illustratively includes a first optical bandpass filter 38 optically coupled to the first optical modulator 37. In the example illustrated in FIG. 2, the first optical modulator 37 is a Mach-Zehnder modulator, while the first optical bandpass filter 38 is a fiber Bragg grating (FBG) with a polarization maintaining (PM) circulator 39 associated therewith, although other suitable components may be used in different embodiments.

The transceiver 33 further illustratively includes an upconverter transmitter branch 40 which includes a second optical modulator 41 optically coupled to the laser 35 and configured to modulate laser light based upon the intermediate frequency input signal, and a second optical bandpass filter 42 optically coupled to the second optical modulator. In the example illustrated in FIG. 2, the second optical modulator 41 is also a Mach-Zehnder modulator, while the second optical bandpass filter 42 is also an FBG with a PM circulator 43 associated therewith, although here again other suitable components may be used in different embodiments.

The transceiver 33 further illustratively includes a shared local oscillator branch 45 which includes a third optical modulator 46 optically coupled to the laser 35 and configured to modulate laser light based upon a local oscillator signal, and a third optical bandpass filter 47 optically coupled to the third optical modulator. In the example illustrated in FIG. 2, the third optical modulator 46 is a phase modulator (although it may be a Mach-Zehnder modulator in some embodiments), while the optical bandpass filter 47 is also an FBG with a PM circulator 48 associated therewith, although here again other suitable components may be used in different embodiments.

The transceiver 33 further illustratively includes a first photodetector 50 optically coupled to the first and third optical bandpass filters 38, 47 and configured to generate a downconverted intermediate frequency output signal (IF OUT in FIG. 2). A second photodetector 51 is optically coupled to the second and third optical bandpass filters 42, 47 and configured to generate an upconverted RF output signal (RF OUT in FIG. 2). In the example illustrated in FIG. 2, the first photodetector 50 comprises a balanced photodetector pair, although different types of photodetectors may be used in different embodiments.

In the example embodiment illustrated in FIG. 2, the transceiver 33 further illustratively includes an optical amplifier 55 coupled between the laser 35 and the first, second, and third optical modulators 37, 41, 46. More particularly, in this example embodiment the amplifier 55 is an erbium doped fiber amplifier (EDFA), although other suitable amplifiers (or potentially no amplifiers) may be used in different embodiments. Another optical amplifier 56 (e.g., EDFA) is also illustratively coupled between the third optical modulator 46 and the FBG 47 in this example embodiment, although here again this optical amplifier need not be used in all embodiments. Additionally, various optical couplers 60-64 may be used to split the optical signals paths where appropriate, as shown in FIG. 2.

The photonic frequency converting transceiver 33 may further include a respective optical waveguide 52, 53, 54 coupled between each of the first, second, and third bandpass filters 38, 42, 47 and the first and second photodetectors 50, 51 as shown. In accordance with one example embodiment, the transceiver 33 may further include a common housing 70, and the downconverter receiver branch 36, the upconverter transmitter branch 40, the shared local oscillator branch 45, the laser 35 and the first and second photodetectors 50, 51 may be carried by the common housing. By way of example, this hardware may be assembled on peripheral component interface (PCI) cards for integration in a reconfigurable space payload housing (e.g., rack mount box, etc.), for example, although other suitable housing components may also be used. In accordance with the example embodiment shown in FIG. 2, the above-noted components may instead be integrated on a photonic chip substrate 71. That is, the illustrated components may be formed as an integrated semiconductor device.

A related photonic frequency conversion method in accordance with an example embodiment is now described with reference to the flow diagram 80 of FIG. 3. Beginning at Block 81, the method illustratively includes modulating light from the laser 35 based upon the RF input signal using the first optical modulator 37, and filtering the laser light modulated based upon the RF input signal with the first optical bandpass filter 38, at Block 82. The method further illustratively includes modulating light from the laser 35 based upon the intermediate frequency input signal using the second optical modulator 41, and filtering the light modulated based upon the intermediate frequency input with the second optical bandpass filter 42, at Block 83. Moreover, the method also illustratively includes modulating light from the laser 35 based upon the shared local oscillator signal using the third optical modulator 46, and filtering the light modulated based upon the shared local oscillator signal with the third optical bandpass filter 47, at Block 84. The method further illustratively includes generating the downconverted intermediate frequency output signal using the first photodetector 50, at Block 85, and generating the upconverted RF output signal using the second photodetector 51, at Block 86, as discussed further above. The method of FIG. 4 illustratively concludes at Block 87. It should be noted that the implementation illustrated in FIG. 3 is but one example embodiment, and that various operations illustrated therein may be performed in different orders or at the same time in some implementations, which will be understood based upon the teachings provided herein.

The photonic frequency converting transceiver 33 may accordingly simultaneously up- and down-convert next-gen bands (e.g., emerging radar frequencies, etc.) to and from a user-defined intermediate frequency for seamless integration to existing digital signal processing receivers. That is, with the transceiver 33 both high and low frequency RF signals may advantageously be simultaneously down- and up-converted to low and high frequency RF signals, respectively. Moreover, using the shared local oscillator branch 45 for transceiving advantageously reduces the amount of filtering needed. The transceiver 33 may also advantageously provide for RF-over-fiber implementations, relatively low latency of optical signals, and SWaP that is improved with respect to traditional coaxial cabling and RF electronics.

As such, the transceiver 33 may help to provide a path to integrated photonics implementations in various applications. For example, such applications may include radar implementations (e.g., self-driving cars, etc.), backhauling between cellular towers, etc.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A photonic frequency converting transceiver comprising:
   a laser;
   a downconverter receiver branch comprising a first optical modulator optically coupled to said laser and configured to modulate laser light based upon a radio frequency (RF) input signal, and a first optical bandpass filter optically coupled to said first optical modulator;
   an upconverter transmitter branch comprising a second optical modulator optically coupled to said laser and configured to modulate laser light based upon an intermediate frequency input signal, and a second optical bandpass filter optically coupled to said second optical modulator;
   a shared local oscillator branch comprising a third optical modulator optically coupled to said laser and configured to modulate laser light based upon a local oscillator signal, and a third optical bandpass filter optically coupled to said third optical modulator;
   a first photodetector optically coupled to said first and third optical bandpass filters and configured to generate a downconverted intermediate RF output signal; and
   a second photodetector optically coupled to said second and third optical bandpass filters and configured to generate an upconverted frequency output signal.

2. The photonic frequency converting transceiver of claim 1, wherein said first and second optical modulators comprise Mach-Zehnder modulators.

3. The photonic frequency converting transceiver of claim 1, wherein each of said first, second, and third bandpass filters comprises a fiber Bragg grating.

4. The photonic frequency converting transceiver of claim 3, further comprising a respective polarization maintaining circulator coupled to each of said first, second, and third FBGs.

5. The photonic frequency converting transceiver of claim 1, further comprising a respective optical waveguide coupled between each of said first, second, and third bandpass filters and said first and second photodetectors.

6. The photonic frequency converting transceiver of claim 1, wherein said first photodetector comprises a balanced photodetector.

7. The photonic frequency converting transceiver of claim 1, wherein said laser comprises a continuous wave laser.

8. The photonic frequency converting transceiver of claim 1, further comprising an optical amplifier coupled between said laser and said first, second, and third optical modulators.

9. The photonic frequency converting transceiver of claim 1, further comprising a common housing; and wherein said downconverter receiver branch, said upconverter transmitter branch, said shared local oscillator branch, and said first and second photodetectors are carried by said common housing.

10. The photonic frequency converting transceiver of claim 1, further comprising a photonic chip substrate; and wherein said downconverter receiver branch, said upconverter transmitter branch, said shared local oscillator branch, and said first and second photodetectors are on said photonic chip substrate.

11. A communication system comprising:
    at least one radio frequency (RF) antenna;
    electronic RF circuitry; and
    a photonic frequency converting transceiver coupled to said at least one antenna and said electronic RF circuitry and comprising
    a laser,
    a downconverter receiver branch comprising a first optical modulator optically coupled to said laser and configured to modulate laser light based upon an RF input signal from said at least one antenna, and a first optical bandpass filter optically coupled to said first optical modulator,
    an upconverter transmitter branch comprising a second optical modulator optically coupled to said laser and configured to modulate laser light based upon an intermediate frequency input signal from said electronic RF circuitry, and a second optical bandpass filter optically coupled to said second optical modulator,
    a shared local oscillator branch comprising a third optical modulator optically coupled to said laser and configured to modulate laser light based upon a local oscillator signal, and a third optical bandpass filter optically coupled to said third optical modulator,
    a first photodetector optically coupled to said first and third optical bandpass filters and configured to generate a downconverted intermediate frequency output signal to said electronic RF circuitry, and
    a second photodetector optically coupled to said second and third optical bandpass filters and configured to generate an upconverted RF output signal to said at least one antenna.

12. The communication system of claim 11 wherein said first and second optical modulators comprise Mach-Zehnder modulators.

13. The communication system of claim 11 wherein each of said first, second, and third bandpass filters comprises a fiber Bragg grating.

14. The communication system of claim 11 wherein said photonic frequency converting transceiver further comprises a respective optical waveguide connected between each of said first, second, and third bandpass filters and said first and second photodetectors.

15. The communication system of claim 11 wherein said first photodetector comprises a balanced photodetector.

16. The communication system of claim 11 wherein said laser comprises a continuous wave laser.

17. A photonic frequency conversion method comprising:
    modulating light from a laser based upon a radio frequency (RF) input signal using a first optical modulator, and filtering the laser light modulated based upon the RF input signal with a first optical bandpass filter;
    modulating light from the laser based upon an intermediate RF input signal using a second optical modulator, and filtering the light modulated based upon the intermediate frequency input with a second optical bandpass filter;

modulating light from the laser based upon a shared local oscillator signal using a third optical modulator, and filtering the light modulated based upon the shared local oscillator signal with a third optical bandpass filter;

generating a downconverted intermediate frequency output signal using a first photodetector optically coupled to the first and third optical bandpass filters; and generating an upconverted RF output signal using a second photodetector optically coupled to the second and third optical bandpass filters.

18. The method of claim 17 wherein the first and second optical modulators comprise Mach-Zehnder modulators.

19. The method of claim 17 wherein each of the first, second, and third bandpass filters comprises a fiber Bragg grating.

20. The method of claim 17 wherein the first photodetector comprises a balanced photodetector.

21. The method of claim 17 wherein the laser comprises a continuous wave laser.

* * * * *